UNITED STATES PATENT OFFICE.

ERNEST SOLVAY, OF BRUSSELS, BELGIUM.

PREPARATION OF HYDROCHLORIC ACID.

SPECIFICATION forming part of Letters Patent No. 240,196, dated April 12, 1881.

Application filed June 9, 1880. (No specimens.) Patented in England February 25, 1880.

*To all whom it may concern:*

Be it known that I, ERNEST SOLVAY, of Brussels, in the Kingdom of Belgium, manufacturer, have invented new and useful Improvements in the Preparation of Hydrochloric Acid, (for which I have obtained a patent in England, No. 837, bearing date February 25, 1880,) and of which the following is a specification.

My invention consists in the employment of chloride of calcium for the purpose of obtaining hydrochloric acid free from water and vapor of water. This result is of great importance in those branches of manufacture in which hydrochloric acid is to be converted into chlorine.

I have discovered that from the affinity which chloride of calcium has for water a sufficiently-concentrated solution of the said chloride of calcium has the property of retaining water at a temperature at which it allows hydrochloric acid to escape, and that owing to this property hydrochloric acid may be readily obtained in a dry state under conditions when it would be impossible to do so otherwise. I utilize the property above mentioned either when it is required to collect hydrochloric acid mixed with gases which are to be separated from it, or when, having separate hydrochloric acid or hydrochloric acid accompanied by other gases, it is required to remove only the water or vapor of water carried away with it; or, again, when it is required to drive off the hydrochloric acid from the water in which it is usually in solution, (liquid hydrochloric acid.)

*First case.*—The use of chloride of calcium when the hydrochloric acid is mixed with gases from which it has to be separated, such as the products of combustion or chlorine: Water is generally used for the purpose of collecting hydrochloric acid, which dissolves therein in large quantities; but this method has the disadvantage of not allowing the said gas to be produced afterward in a dry state, for when the liquid hydrochloric acid thus obtained is distilled, water, as well as gas, is evolved at a certain time, unless the distillation be arrested before all the acid is thrown off from the solution. I substitute for water a sufficiently-concentrated solution of chloride of calcium, which absorbs the hydrochloric acid and the water and vapor of water which may accompany it, but not the foreign gases which may be with them. If necessary, the solution may be cooled to effect a complete condensation. By afterward suitably heating the said solution all the hydrochloric acid may be driven off before the vapor of water begins to escape. If the acid to be collected be accompanied by more or less water or vapor of water, a more or less concentrated solution of chloride of calcium will naturally be used, so that the water, which will be collected all the more readily as the solution is less diluted, will not be in such excess as to prevent the hydrochloric acid being evolved in a dry state by complete distillation. The present case is applicable, chiefly, first, when it is desired to separate hydrochloric acid from the products of combustion, either in Leblanc's process during the manufacture of sulphate of soda, or in the process which consists in setting free hydrochloric acid from a mixture of chloride of calcium and silicate of alumina by calcination; secondly, when it is required to separate hydrochloric acid from chlorine, and from air and nitrogen, which may accompany them in those processes in which gaseous hydrochloric acid is converted into chlorine, by mixing the hydrochloric acid with atmospheric air and causing the mixture to pass over certain substances. In this process it is useful to be able to collect in a dry state the hydrochloric acid which escapes, because the reaction has not been complete, as is generally the case.

*Second case.*—The use of chloride of calcium when it is only required to liberate the hydrochloric acid from the water or vapor of water which accompanies it: When, having hydrochloric acid with or without other gas, it is required merely to separate it from water or vapor of water, the operation may be carried out as hereinbefore described—that is to say, by condensing and distilling the hydrochloric acid; but I have invented the means of superseding the condensation of the hydrochloric acid. For this purpose I keep the solution of chloride of calcium at a temperature at which, by reason of its affinity, it condenses water or vapor of water without retaining the hydrochloric acid, so that the water and vapor of water are retained, while the hydrochloric acid pursues its way with the other non-condensable gases, if there be any such gases. The solution of chloride of calcium is diluted successively by the water it absorbs, and it is kept at a suitable degree of concentration by adding to it from time to time solid or very much concentrated chloride of calcium. By this means the necessity of interrupting the operation to regenerate the chloride of calcium is obviated. The operation may be made continuous, either in a single apparatus arranged vertically, or in several apparatus disposed to work systematically, by causing the solution of chloride of calcium to flow in an opposite direction to the gaseous current. In all cases the diluted chloride of calcium removed after the operation is subjected to concentration, so as to be able to serve again in other operations.

*Third case.*—The use of chloride of calcium for driving out hydrochloric acid from the water in which it is usually in solution: When, having ordinary liquid hydrochloric acid, it is desired to drive out the hydrochloric acid completely in a dry state, I dissolve chloride of calcium in the said liquid hydrochloric acid, and then I treat the solution as hereinbefore described, and the hydrochloric acid alone is evolved. Moreover, I use well-known apparatus and processes to effect the condensation of a gas in a liquid.

I claim as my invention—

1. The process of obtaining hydrochloric acid in a dry state, consisting in absorbing it, or the vapors thereof, in a solution of chloride of calcium, and then subjecting such solution to heat to vaporize the acid, substantially as described.

2. The process of obtaining hydrochloric acid in a dry state from solutions of the same, consisting in adding chloride of calcium to such solutions for the purpose of retaining the water, and then applying heat to remove the acid, substantially as described.

ERNEST SOLVAY.

Witnesses:
R. S. KIRKPATRICK,
H. T. E. KIRKPATRICK.